United States Patent
Kaneko et al.

(10) Patent No.: US 8,208,157 B2
(45) Date of Patent: Jun. 26, 2012

(54) SYSTEM AND APPARATUS FOR AUTHORIZING ACCESS TO A NETWORK AND A METHOD OF USING THE SAME

(75) Inventors: Shuichiro Kaneko, Yokohama (JP); Kenji Ogasawara, Kawaguchi (JP); Hiroyuki Ozawa, Kawasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1061 days.

(21) Appl. No.: 11/902,352

(22) Filed: Sep. 20, 2007

(65) Prior Publication Data

US 2008/0086762 A1   Apr. 10, 2008

(30) Foreign Application Priority Data

Oct. 6, 2006   (JP) .................................. 2006-275363

(51) Int. Cl.
*G06F 3/12* (2006.01)

(52) U.S. Cl. ............. 358/1.15; 283/72; 283/73; 283/90; 235/494; 713/176; 713/170; 713/179; 348/14.01; 705/51; 705/14.66; 705/30; 709/224; 358/1.14; 358/3.28; 358/474; 726/1; 726/2; 726/3; 726/4; 726/26

(58) Field of Classification Search .................... 726/4
See application file for complete search history.

(56) References Cited

U.S. PATENT DOCUMENTS

| | | | |
|---|---|---|---|
| 6,721,613 B1 * | 4/2004 | Yamamoto et al. ............. 700/90 |
| 7,484,246 B2 | 1/2009 | Matsuyama et al. | |
| 7,516,493 B2 | 4/2009 | Matsuyama et al. | |
| 7,611,050 B2 * | 11/2009 | Fukui et al. .................... 235/380 |
| 7,644,443 B2 | 1/2010 | Matsuyama et al. | |
| 7,652,781 B2 * | 1/2010 | Fukui et al. ................... 358/1.15 |
| 7,693,298 B2 * | 4/2010 | Fukui et al. .................... 382/100 |
| 2005/0078974 A1 * | 4/2005 | Uchida et al. .................... 399/81 |
| 2005/0132029 A1 | 6/2005 | Fukao et al. | |
| 2006/0072144 A1 * | 4/2006 | Dowling et al. ............. 358/1.15 |
| 2006/0274358 A1 * | 12/2006 | Fukui et al. ................... 358/1.15 |
| 2006/0274359 A1 * | 12/2006 | Fukui et al. ................... 358/1.15 |
| 2006/0274360 A1 * | 12/2006 | Fukui et al. ................... 358/1.15 |
| 2007/0011198 A1 * | 1/2007 | Fukui et al. ................. 707/104.1 |

(Continued)

FOREIGN PATENT DOCUMENTS

JP   2002-83280 A   3/2002

(Continued)

OTHER PUBLICATIONS

Decision of Refusal issued in the corresponding Japanese Patent Application No. 2006-275363 dated Jun. 29, 2010, and an English Translation thereof.

(Continued)

*Primary Examiner* — Nathan Flynn
*Assistant Examiner* — Bryan Wright
(74) *Attorney, Agent, or Firm* — Buchanan Ingersoll & Rooney PC

(57) ABSTRACT

An authentication apparatus outputs an application form to be used in applying for access authorization, which is printed with an identification image showing information including identification information of terminal equipment. The authentication apparatus scans the application form which is filled out by a user as required, recognizes the abovementioned information from the image data obtained by scanning, and authorizes the terminal equipment that corresponds to the abovementioned recognized information to have access to a specified network.

12 Claims, 15 Drawing Sheets

U.S. PATENT DOCUMENTS

| | | | |
|---|---|---|---|
| 2007/0011410 A1* | 1/2007 | Fukui et al. | 711/154 |
| 2007/0031046 A1* | 2/2007 | Onishi | 382/232 |
| 2007/0208827 A1* | 9/2007 | Fukui et al. | 709/219 |
| 2007/0214508 A1* | 9/2007 | Fukui et al. | 726/28 |

FOREIGN PATENT DOCUMENTS

| | | |
|---|---|---|
| JP | 2002-169719 | 6/2002 |
| JP | 2003-281148 | 10/2003 |
| JP | 2004-164425 | 6/2004 |
| JP | 2005-196732 | 7/2005 |
| JP | 2006-067273 | 3/2006 |

OTHER PUBLICATIONS

Notification of Reason for Refusal, Japanese Application No. 2006-275363, dated Aug. 4, 2009.

Notice of Reason for Refusal in JP 2006-275363 dated Oct. 28, 2008, and a Partial English Translation thereof.

* cited by examiner

MAC address 12:34:56:78:9a:bc

Date/Time application form is prepared: 10 Mar. 2006 13:20:05

Identification information of authentication apparatus | HZ0a3wYc20060310132005

FIG.13

| Identification information of authentication apparatus | Identification information of terminal equipment | Section | Name | Password | Level | Period of use | Purpose of use |
|---|---|---|---|---|---|---|---|
| HZ0a3wYc20060310132005 | QAj987Er | No. 2 Sales Section | Taro Tanaka | TAROUZ99 | 2 (Manager) | 03/10–03/12 | Sales planning ... |
| HZ0a3wYc20060310142005 | SYbd03Hg | No. 1 Development Section | Ichiro Suzuki | KoniMino | 3 (Executive) | 03/10–03/10 | Training information ... |
| HZ0a3wYc20060310152004 | 6s7Uj9oL | No. 1 Development Section | Hanako Sato | 03347765 | 1 (General) | 03/09–03/09 | Development ... |
|  |  |  |  |  |  |  |  |
|  |  |  |  |  |  |  |  |
|  |  |  |  |  |  |  |  |

| Section | Name | Password | Job classification |
|---|---|---|---|
| No. 2 Sales Section | Taro Tanaka | TAROUZ99 | Manager |
| No. 1 Development Section | Ichiro Suzuki | KoniMino | Executive |
| No. 1 Development Section | Hanako Sato | 03347765 | General |
| | | | |
| | | | |
| | | | |

| Identification information of terminal equipment (621) | Access level (622) |
|---|---|
| QAj987Er | 2 (Manager) |
| SYbd03Hg | 3 (Executive) |
| 6s7Uj9oL | 1 (General) |
| | |
| | |
| | |

SYSTEM AND APPARATUS FOR AUTHORIZING ACCESS TO A NETWORK AND A METHOD OF USING THE SAME

CROSS-REFERENCE TO RELATED APPLICATION

This application is based on Japanese Patent Application No. 2006-275363 filed on Oct. 6, 2006, the contents of which are incorporated herein by reference.

BACKGROUND

1. Technical Field

The present invention relates to an authentication apparatus, an authentication system, an authentication method, and a computer readable recording medium stored with a program for controlling the authentication apparatus. The present invention relates particularly to authentication technology for authorizing a reliable visitor to have access to, for example, a network containing confidential information.

2. Description of Related Art

In authorizing a reliable visitor to have access to a network containing confidential information in an office environment where security is maintained, it has been necessary for the system manager to establish a certain setup on the visitor's terminal equipment concerning the network.

However, it causes a substantial burden on the system manager in order for the system manager to be involved constantly in the network setup work and also makes it difficult to respond quickly to a visitor. Therefore, various methods have been proposed to authorize a reliable visitor to have access to a network system containing confidential information via a specific authentication apparatus without bothering the system manager.

One of such an authentication method is to have access to the authentication apparatus from terminal equipment such as a personal computer ("PC") and a personal digital assistant ("PDA") connected to the authentication apparatus via a network to achieve authentications. However, such an authentication method does not guarantee the fact that the user entered the area where the authentication apparatus is installed, in other word, that the user made any physical operation at the authentication apparatus. Therefore, it leaves a possibility of hacking, i.e., unauthorized access to the authentication apparatus from remote terminal equipment.

Another method, which has been proposed, was to authenticate access by causing application forms or cards to be read by the authentication apparatus. See Unexamined Japanese Patent Publication No. 2002-83280. This method guarantees the fact that it required the user to make a physical operation at the authentication apparatus. However, it leaves a possibility that a copied or stolen application form, or a discarded application form is fraudulently used. Consequently, there was a problem that it is difficult to prevent unauthorized access to the network based on such a fraudulent application.

SUMMARY

It is an object of the present invention to provide an authentication apparatus, an authentication system, an authentication method, and a computer readable recording medium stored with a program for controlling the authentication apparatus, which are improved for solving the abovementioned problem.

It is another object of the present invention to provide an authentication apparatus, an authentication system, an authentication method, and a computer readable recording medium stored with a program for controlling the authentication apparatus that are capable of authorizing a reliable visitor to have access to, for example, a network containing confidential information while maintaining sufficient security without causing the system manager's intervention.

To achieve at least one of the abovementioned objects, there is provided an authentication apparatus for authorizing access from terminal equipment to a specified network, which reflects one aspect of the present invention. The authentication apparatus comprises: an outputting unit for outputting an application form to be used in applying for said access authorization, which is printed with an identification image showing information including identification information of said terminal equipment; a scanning unit for scanning said application form; a recognizing unit for recognizing said information from image data obtained by scanning; and an authorizing unit for authorizing the terminal equipment that corresponds to said information recognized by said recognizing unit to have access to said network.

It is preferable that said authentication apparatus further comprises a receiving unit for receiving from said terminal equipment the identification information of said terminal equipment.

It is preferable that said authentication apparatus further comprises a registering unit for registering said information to a management part, and said authorizing unit authorizes the terminal equipment that corresponds to said information recognized by said recognizing unit to have access to said network when said information recognized by said recognizing unit is judged to be registered in said management part.

It is preferable that said information includes the identification information of said authentication apparatus.

It is preferable that said identification image is encoded.

It is preferable that said recognizing unit further recognizes user's idiosyncratic information from image data obtained by scanning said application form, and said authorizing unit authorizes access to said network only when the user that corresponds to the recognized idiosyncratic information is authenticated.

It is preferable that the user's authentication is executed by inquiring an external server different from said authentication apparatus.

It is preferable that said authentication apparatus further comprises a judging unit for judging an access level suitable for the user that corresponds to the recognized idiosyncratic information, and said authorizing unit authorizes access corresponding to the judged level.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 13 is an example of an application form management table.

FIG. 16 is an example of authentication database to be stored in a server.

FIG. 17 is an example of the routing management table.

DETAILED DESCRIPTION

The preferred embodiments of the invention will be described in detail below with reference to the accompanying drawings.

Figure 1:
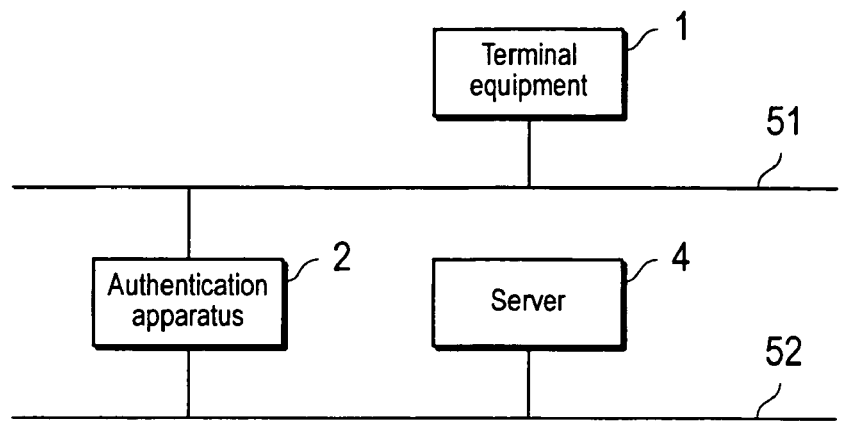
FIG. 1 is an overall constitutional diagram of an authentication system according to a first embodiment of the invention.

FIG. 1 is an overall constitutional diagram of the authentication system according to a first embodiment of the invention.

The authentication system is equipped with an authentication apparatus 2, terminal equipment 1 connected to be able to communicate via a first network 51 with the authentication apparatus 2, and a server 4 connected to be able to communicate via a second network 52 with the authentication apparatus 2. The types and the number of equipment to be connected to the networks 51 and 52 are not limited to those shown in FIG. 1.

The first network 51 is a network of relatively loose security of a level that makes it possible to connect with external equipment via the Internet, etc. In other words, the first network 51 is categorized as a network which a visitor can easily use. On the other hand, the second security network 52 is a network of higher security, which contains the server 4 storing confidential information and the like. In other works, the second network 52 is categorized as a network that authorizes access only for those users who are authenticated. An authentication apparatus 2 has a function of data routing function between the first network 51 and the second network 52.

Next, constitution of each device mentioned above will be described below, but the description of a function common to multiple devices will be made only once when it first appears and will not be repeated afterwards in order to avoid duplicate descriptions.

Figure 2:
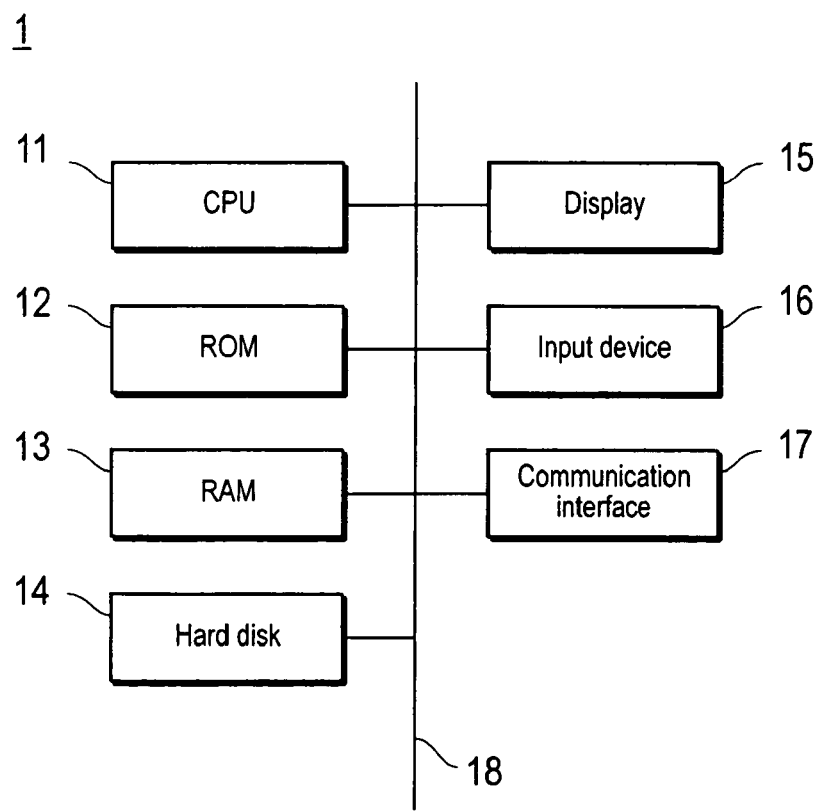
FIG. 2 is a block diagram showing the general constitution of the terminal equipment.

FIG. 2 is a block diagram showing the general constitution of terminal equipment 1. The terminal equipment 1 is a general purpose PC (personal computer).

The terminal equipment 1 contains a CPU 11, a ROM 12, a RAM 13, a hard disk 14, a display 15, an input device 16 and a network interface 17, all of which are interconnected by a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

The display 15 is typically a LCD or a CRT and displays various kinds of information. The input device 16 includes a pointing device such as a mouse, a keyboard, and others, and is used for executing various kinds of inputs. The network interface 17 is typically a LAN card and is used for communicating with authentication apparatus 2 via the network 51.

Figure 3:
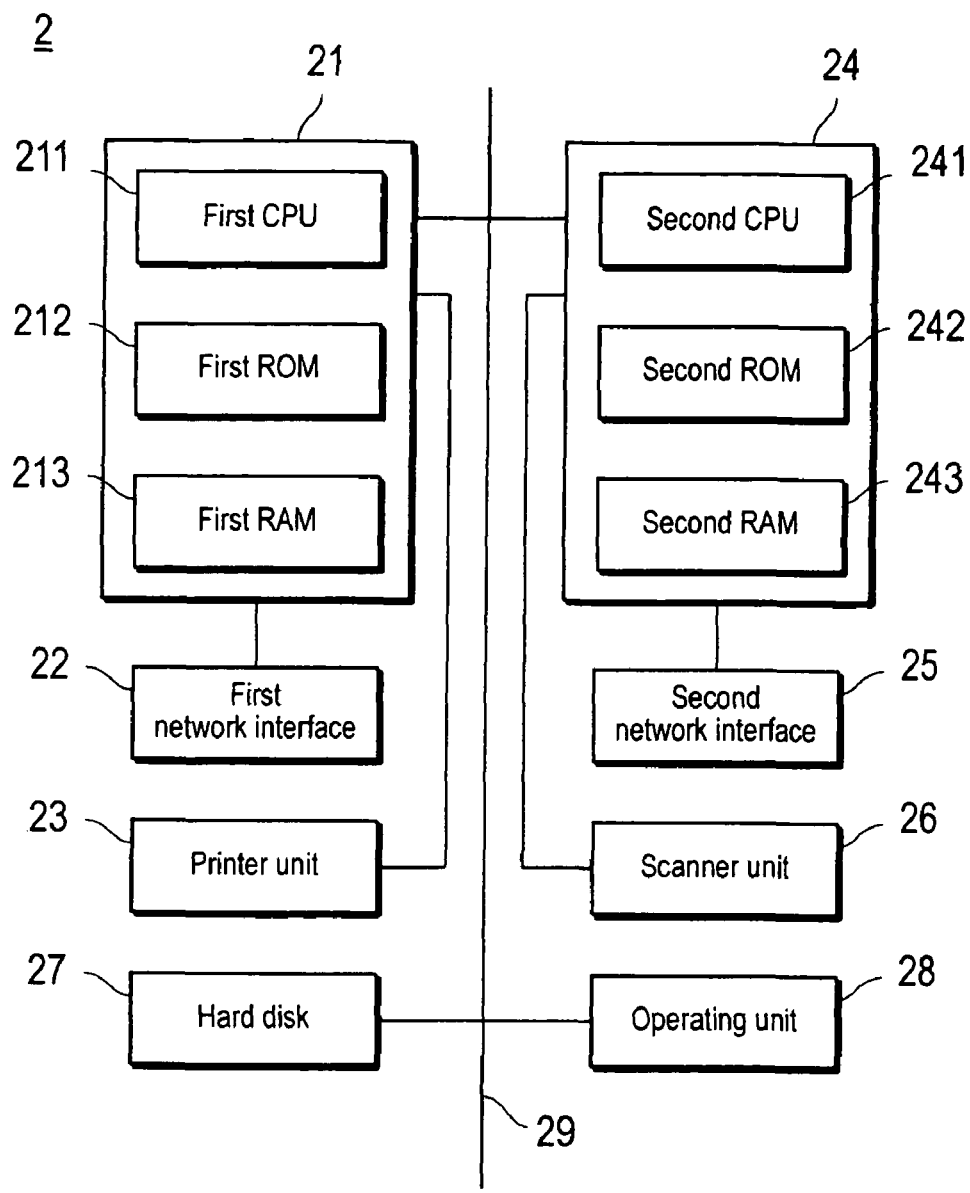
FIG. 3 is a block diagram showing the general constitution of the authentication apparatus.

FIG. 3 is a block diagram showing the general constitution of the authentication apparatus 2. In the present embodiment, the authentication apparatus 2 is materialized using a Multi-Function Peripheral ("MFP").

The authentication apparatus 2 contains a printer control unit 21, a scanner control unit 24, a hard disk 27, and an operating unit 28, all of which are interconnected via a bus 29 for exchanging signals. The printer control unit 21 is connected with a first network interface 22 and a printer unit 23. The scanner control unit 24 is connected with a second network interface 25 and a scanner unit 26.

Figure 4:
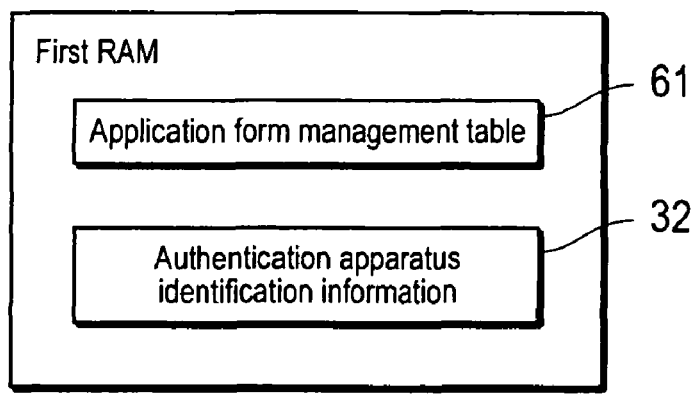
FIG. 4 is a diagram showing an application form management table and authentication apparatus identification information.
Figure 5:
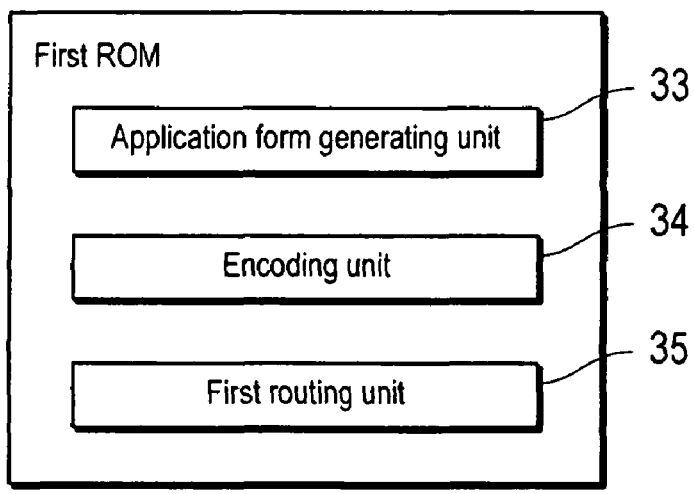
FIG. 5 is a diagram showing an application form generating unit, an encoding unit, and a first routing unit.

The printer control unit 21 contains a first CPU 211, a first ROM 212, and a first RAM 213. As is shown in FIG. 4, the first RAM 213 stores an application form management table 61 and authentication equipment identification information 32. Also, as shown in FIG. 5, the first ROM 212 stores an application form generating unit 33, an encoding unit 34, and a first routing unit 35 as programs. The functions of units 33-35 are realized as the first CPU 211 executes these programs.

Figures 11, 12:
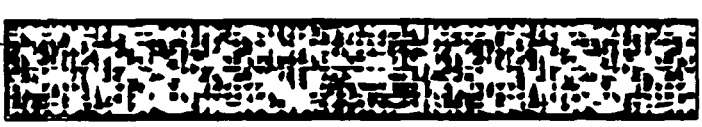
FIG. 11 is a diagram for describing a method of generating the identification information of the authentication apparatus.
FIG. 12 is a diagram showing an example of the application form.

What is meant by the application form is the application form used for requesting authorization for access to the second network 52 (FIG. 12). The application form management table 61 is the table for managing the information obtained from the image data, generated by reading the application form which is filled out as required by the user.

The authentication apparatus identification information 32 is information generated dynamically at a preliminarily held or arbitrary timing in order to differentiate an individual from another individual in the authentication apparatus 2. The authentication identification information 32 can be held fixedly in the first ROM 212 when it is held preliminarily. The authentication apparatus identification information 32 is information generated by arbitrary logic containing information for identifying individual when it is generated dynamically, the detail of which will be described later (FIG. 11). The authentication apparatus identification information 32 can be prepared fixedly or the information generated dynamically on the application form as an application issuing ID separately as the information is generated dynamically with the issue of the application form.

The application form generating unit 33 generates image data of the application form to be printed. The encoding unit 34 executes encoding of information. The first routing unit 35 executes the process of relaying data.

Figure 6:
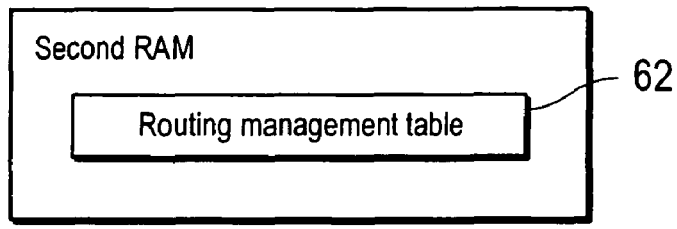
FIG. 6 is a diagram showing a routing management table.
Figure 7:
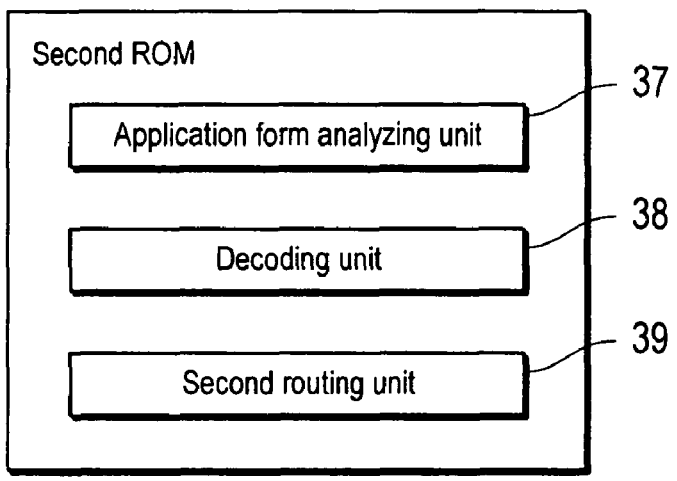
FIG. 7 is a diagram showing an application form analyzing unit, a decoding unit, and a second routing unit.

The scanner control unit 24 contains a second CPU 241, a second ROM 242, and a second RAM 243. As shown in FIG. 6, the second RAM 243 stores the routing management table 62. Also, as shown in FIG. 7, the second ROM 242 stores an application form analyzing unit 37, a decoding unit 38, and a second routing unit 39 as programs. The functions of units 37-39 are realized as the second CPU 241 executes these programs.

The routing management table 62 is a table for managing information used for the process of relaying data. The application form analyzing unit 37 analyzes the image data generated by reading the application form, which is filled out as required by the user. The decoding unit 38 executes decoding of information. The second routing unit 39 executes the process of relaying data.

The first network interface 22 is used for communicating with, e.g., the terminal equipment 1 via the network 51. The printer unit 23 prints image data on recording media such as paper using a known imaging process such as the electronic photographing process including such processes as electrical charging, exposure, developing, transferring and fixing. The second network interface 25 is used for communicating with, e.g., the server 4 via the network 52. The scanner unit 26 obtains image data by reading documents such as the application form.

The operating unit 28 is used for various information displays and for entering various instructions. More specifically, the operating unit 28 is equipped with buttons and keys for accepting ordinary operations such as scanning, printing and copying using the scanner unit 26 and the printer unit 23. The operating unit 28 is also equipped with a touch panel for accepting operations for the system manager for managing the authentication apparatus 2. When the system manager operates the managed information, a password and the like is required for security.

In the present embodiment, it is preferable to have the control for the first network 51 is separated rigorously from the control for the second network 52, so that it is constituted in such a way that the printer control unit 21 is separated from the scanner control unit 24. However, it can be constituted in such a way as to have the printer control unit 21 and the scanner control unit 24 combined in order to downsize the authentication system. In such a case, the first CPU 211 and the second CPU 241, the first ROM 212 and the second ROM 242. and the first RAM 213 and the second RAM 243 are each combined.

The operation of the authentication system in this embodiment will be described in the following.

In the present embodiment, authentication is executed via the authentication apparatus 2 in order to authorize a reliable visitor to have access to a network containing confidential information without bothering the system manager in an office environment where a certain level of security is maintained.

In the authentication system of the present embodiment, a reliable visitor who visits an office where the authentication apparatus 2 is installed, the terminal equipment 1 owned by the visitor is authorized to be connected to the first network 51 in the initial status. DHCP (Dynamic Host Configuration Protocol) is used for this connection to the network. The visitor is authorized to access the authentication apparatus 2 from the terminal equipment 1 via the first network 51 by executing a simple setup.

FIG. 8 through FIG. 10 and FIG. 18 are flowcharts showing the process sequence of the printer control unit 21 of the authentication apparatus 2. The algorithm shown in the flowcharts of FIG. 8 through FIG. 10 and FIG. 18 is stored as a program in a storage unit, such as the first ROM 212, and executed by the first CPU 211.

Figure 8:
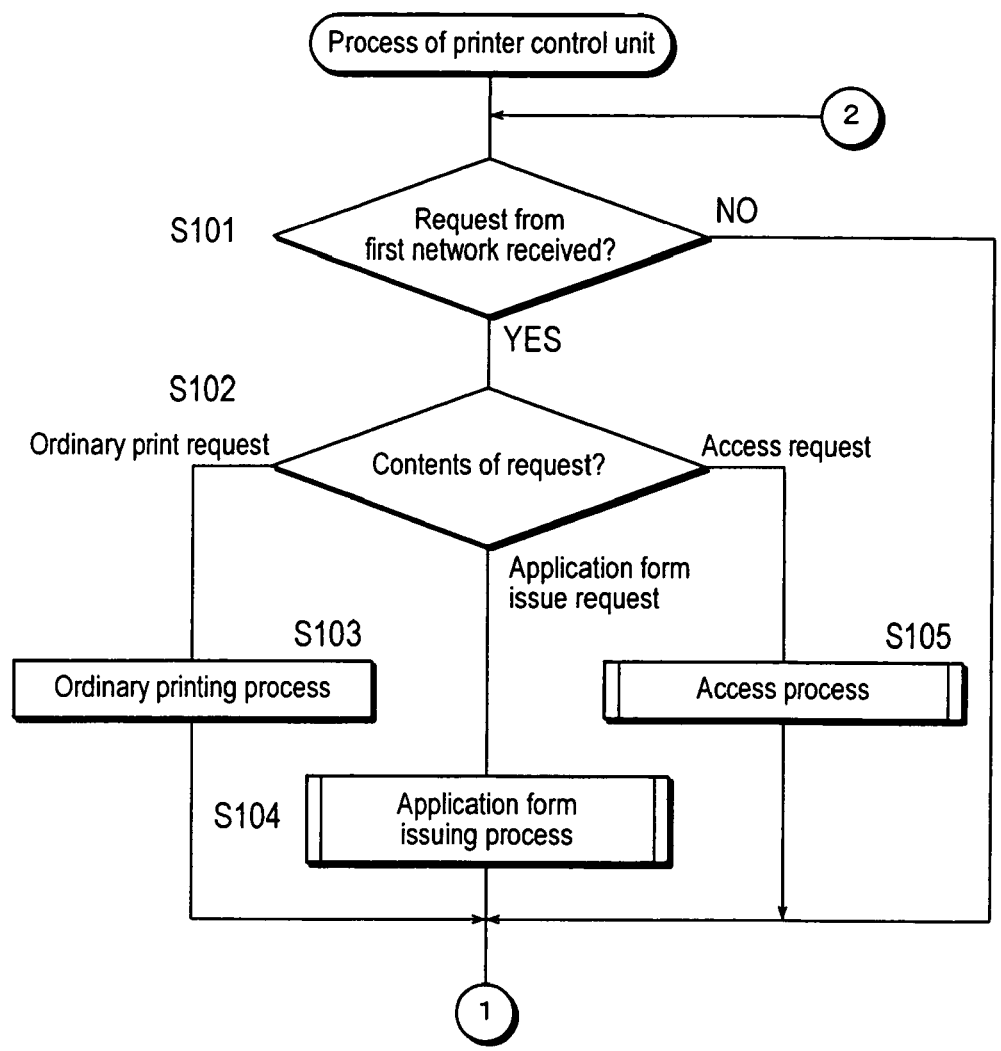
FIG. 8 is a flowchart showing the process sequence of a printer control unit of the authentication apparatus.

As is shown in FIG. 8, when the printer control unit 21 of the authentication apparatus 2 receives a request from the terminal equipment 1 via the first network 51 (S101: Yes), it makes a judgment whether the contents of the request is an ordinary printing request, a request for issuing an application form, or a request for access (S102).

If the contents of the received request is an ordinary printing request (S102: ordinary printing request), an ordinary printing process is executed. In other words, the received printing data is converted into image data of a bitmap format and outputted to the printer unit 23 for printing (S103).

If the contents of the received request is a request for issuing an application form (S102: request of issuing application form), the application form issuing process is executed (S104). The detail of the application form issuing process will be described later using FIG. 10.

On the other hand, if the contents of the received request is an access request (S102: request of access), the access process is executed (S105). The detail of the access process will be described later using FIG. 18.

Figure 10:
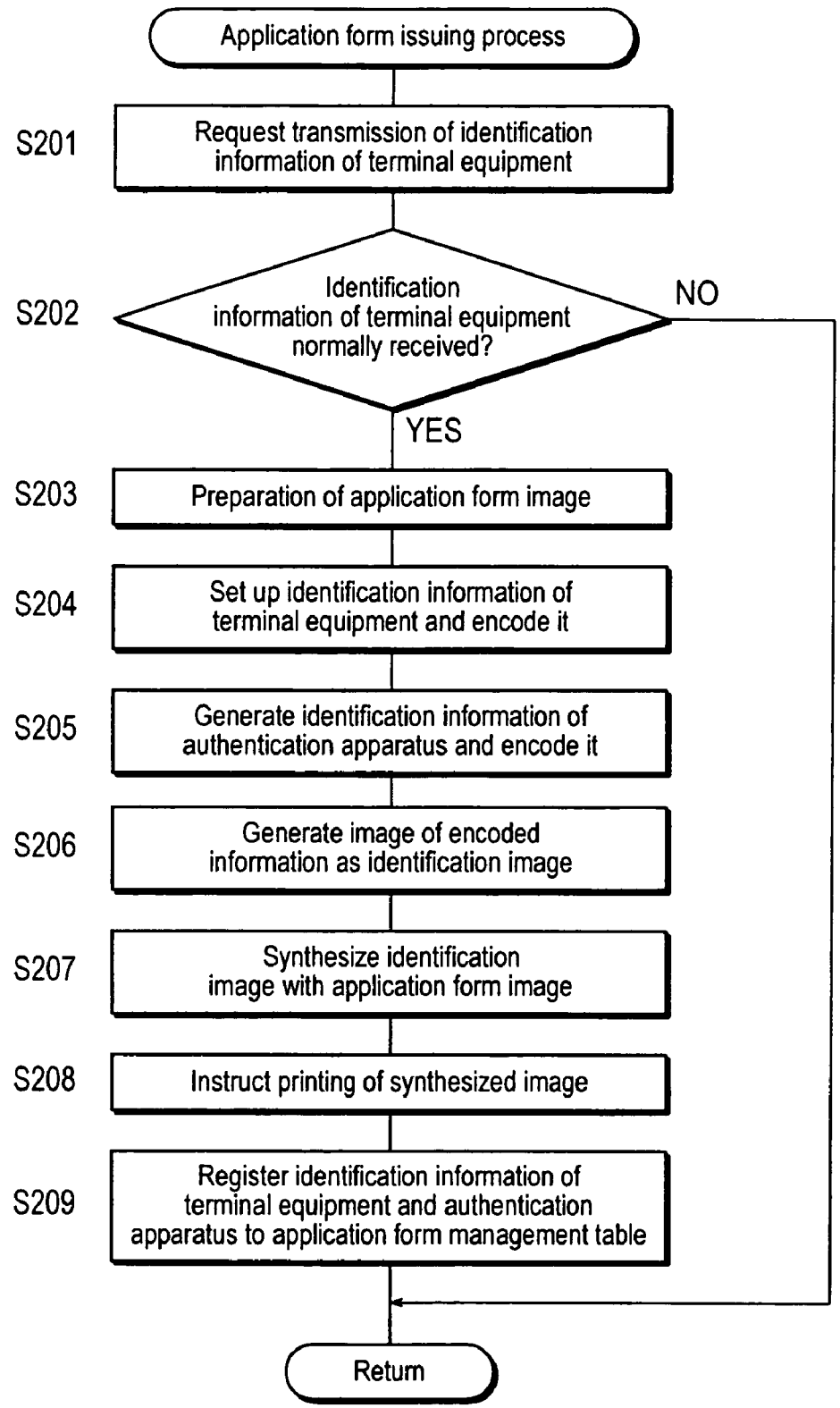
FIG. 10 is a flowchart showing the sequence of the application form issuing process.

Next, the application form issuing process (step S104 shown in FIG. 8) will be described below with reference to FIG. 10. As is shown in FIG. 10, as the first step of the application form issuing process, a request for transmitting the identification information of the terminal equipment is made to the terminal equipment 1, which is the source of request for the application form, in order to identify the particular terminal equipment 1 (S201).

Next, a judgment is made as to whether the identification information of the terminal equipment 1 is received properly or not (S202). If the identification information of the terminal equipment 1 is not received properly (S202: No), the application form is not issued and the program returns to the flow chart of FIG. 8.

If the identification information of the terminal equipment 1 is properly received (S202: Yes), the application form image is generated (S203). The identification information of the terminal equipment 1 is an MAC address unique to the terminal equipment 1. The application form image is a common image with characters. frames and others that is used common to all application forms.

Next, the identification information of the terminal equipment 1 is set up and encoded (S204). In other words, the unique MAC address received in step S202 is digitized and set up as the new identification information of the terminal equipment 1. For example, eight digit alpha-numeric characters uniquely generated by an arbitrary calculation method is obtained as the result of this digitization. As a method of uniquely generating eight digit alpha-numeric characters, MD5 (Message Digest 5) and Jash functions such as SHA (Secure Hash Algorithm) can be used. These digitization processed can be omitted as well. The identification information of the terminal equipment 1 thus set up is encoded by the encoding unit 34.

In the present embodiment, an unreadable random pattern graphic is generated as a result of encoding by the encoding unit 34.

Next, the identification information of the authentication apparatus 2 is generated and encoded (S205).

FIG. 11 is a diagram for describing a method of generating the identification information of the authentication apparatus. The identification information of the authentication apparatus 2 is 22-character information consisting of eight digit alpha-numeric characters generated by an arbitrary calculation method unique to the MAC address and 14 characters representing the date and time when the application form is generated in the format of "YYYYMMDDhhmmss." "YYYY" represents years AD, "MM" represents month, "DD" represents day, "hh" represents month, "mm" represents minute, and "ss" represents seconds.

It is also possible to treat the eight digit alpha-numeric character string generated from the MAC address as the identification information of the authentication apparatus 2, and the 14 digits character string generated from the date and time of the application as the ID unique to the application form issue. However, the process at the authentication apparatus 2 in such a case is the same as the process executed when the abovementioned 22 digits information is treated as the identification information of the authentication apparatus 2. And, the identification information of the authentication apparatus 2 thus generated is encoded by the encoding unit 34.

Next, the graphic images obtained by encoding in steps S204 and S205 are generated as identification images (S206).

The identification image generated in step S206 and the form image of the application form generated in step S203 are synthesized (S207), and the synthesized image is instructed to be printed (S208). Upon receiving such an instruction, the printer 23 issues an application form by printing the synthesized image.

FIG. 12 is a diagram showing an example of the application form. The application form 60 contains fill-out fields 601-605 to be filled out such as the information such as the office section, name and password that can be used for identifying the applicant, the information concerning the rules of usage of the terminal equipment such as a usage period, and any additional information that does not affect the authentication directly, e.g., the purpose of usage. The application form 60 also includes an identification image 606 that contains the identification information of the terminal equipment 1 and the identification information of the authentication apparatus 2. FIG. 12 shows the application form that has been filled out by the user.

The printing of the identification image 606 is considered printing of a random pattern graphic which is made unreadable by encoding. Any forgery of an application form can be effectively prevented by such encoding. However, the present invention is not limited to the printing of the unreadable random pattern graphic by encoding. The printing of the identification image 606 is preferably the printing of a type of image that cannot be ordinarily deciphered by human being, for example, printing of encoded character code, printing in invisible ink, or printing a ground pattern on paper.

The effect of the present invention can also be achieved with a constitution of printing only the identification image 606 on the application form 60. The identification image 606 must always include an image showing identification information of the terminal equipment 1 but the image showing the identification information of the authentication apparatus 2 need not be included necessarily. However, if an image showing the identification information of the authentication apparatus 2 is included in the identification image 606 of the application form 60, the security is improved by controlling the particular application form 60 to be accepted only by the authentication apparatus 2 that issued it.

In step S209, the identification information of the authentication apparatus 2 and the identification information of the terminal equipment 1 used in preparing the application form are registered in the application form management table. FIG. 13 is an example of the application form management table. In this step S209, the field 612 for the identification information of the terminal equipment 1 and the field 611 for the identification information of the authentication apparatus 2 are registered on the application form management table 61.

Although simple printing requests are authorized for visitors in the initial status (refer to S103) in view of the fact that simple printing requests assert little threats on security in the present embodiment, it can also be constituted in such a way as not to authorize any printing other than for the request of issuing the application form in the initial status.

The process of steps S106-S112 will be described later.

Figure 14:
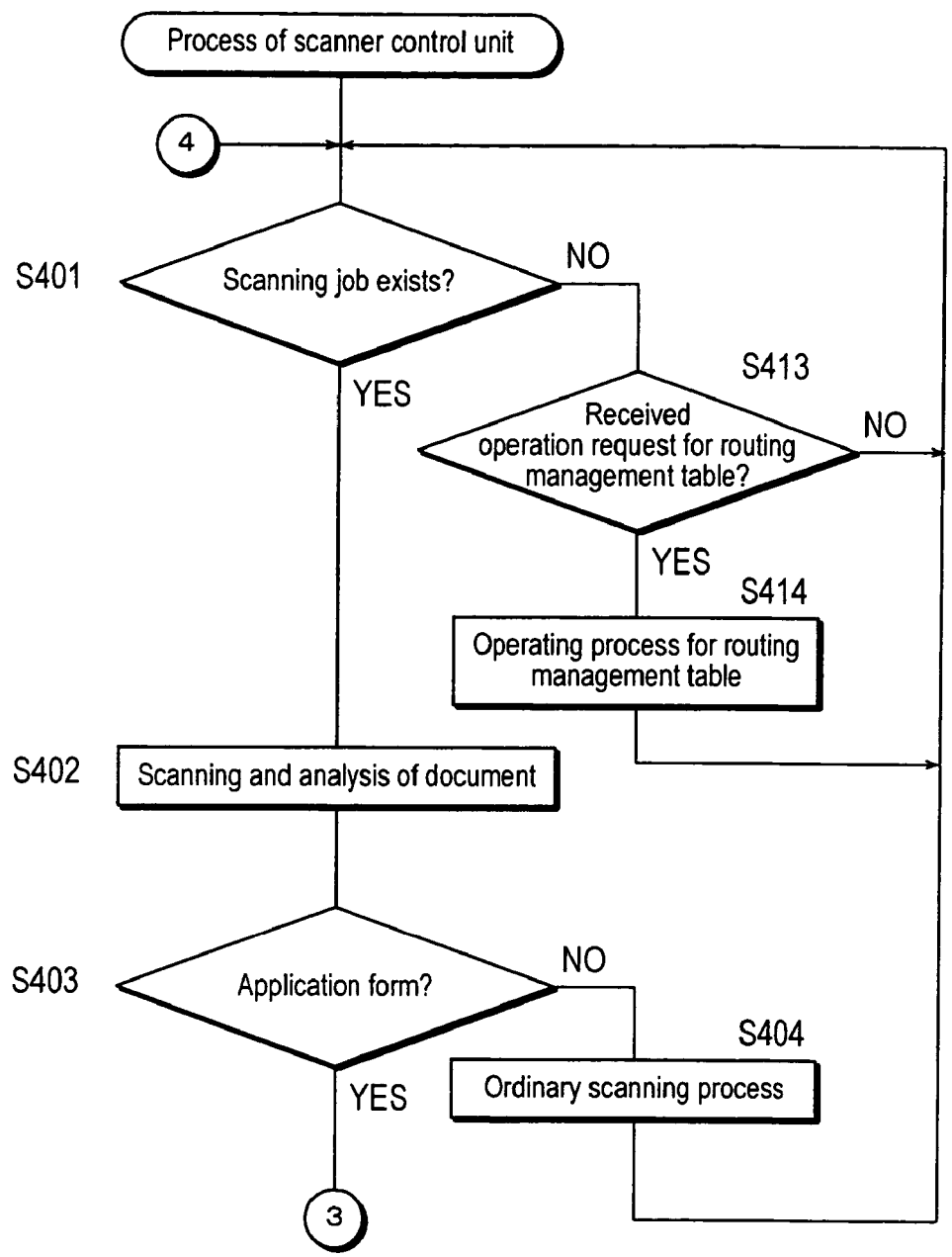
FIG. 14 is a flowchart showing the process sequence of a scanner control unit of the authentication apparatus.
Figure 15:
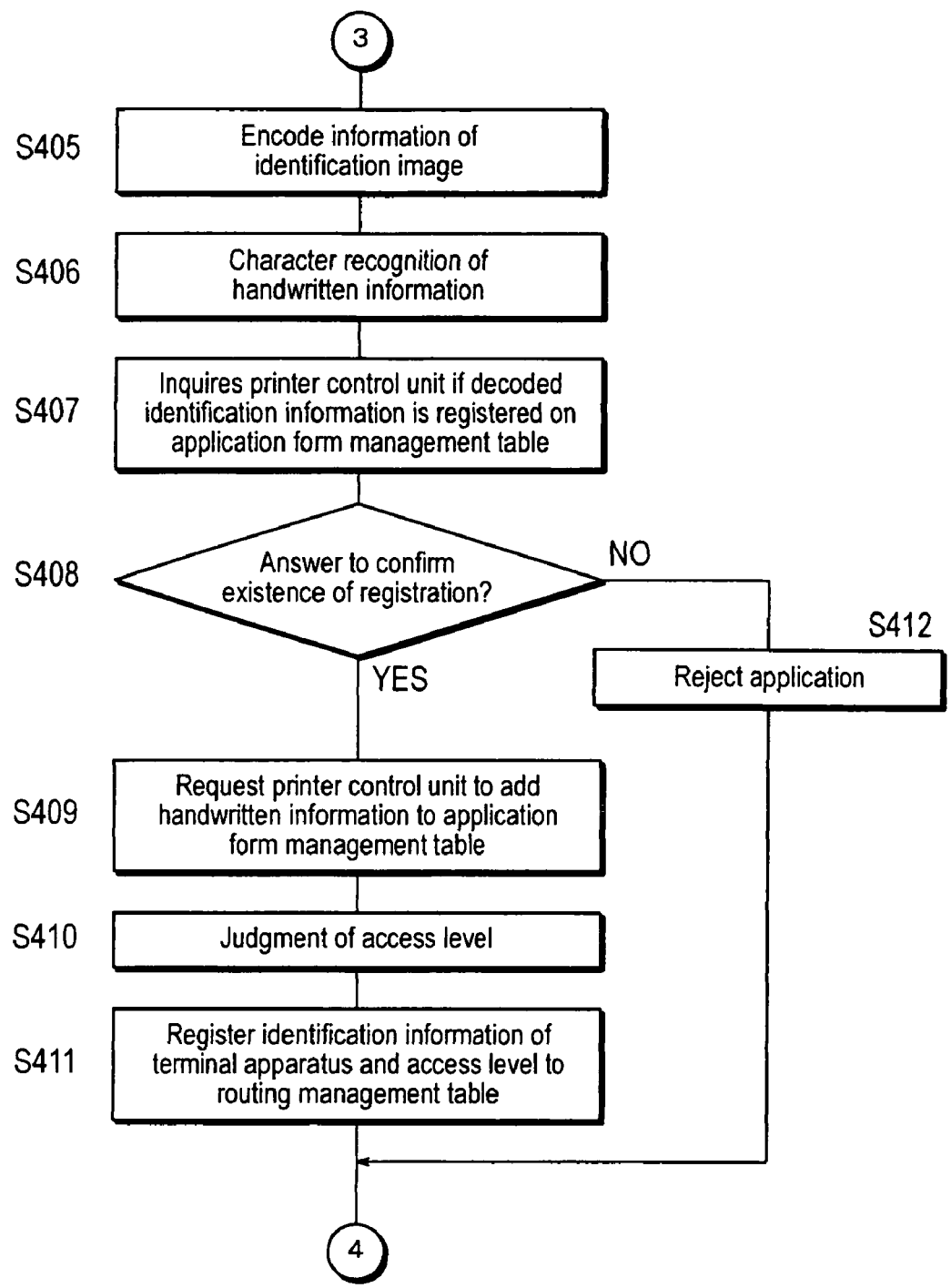
FIG. 15 is a flowchart showing the process sequence of the scanner control unit of the authentication apparatus continued from FIG. 14.

Next, the process in the scanner control unit 24 of the authentication apparatus 2 will be described below with reference to FIG. 14 and FIG. 15. The algorithm shown in the flowcharts of FIG. 14 and FIG. 15 is stored as a program in a storage unit, such as the second ROM 242, and executed by the second CPU 241.

First, the scanner control unit 24 makes a judgment as to whether a scan job exists or not, i.e., whether an instruction to read a document by the scanner unit 26 is received or not (S401).

If a scan job exists (S401: Yes), reading and analysis of the document are executed (S402).

In step S403, a judgment is made as to whether the scanned document is the application form 60 or not. Such a judgment can be executed by reading, for example, predetermined information which is located in a predetermined position of the document. It can also be constituted in such a way that a special button is provided for authentication on the operating unit 28 of the authentication apparatus 2 and judge that a scanning instruction is made when this button is depressed.

If it is judged that the document is not the application form 60 (S403: No), an ordinary scanning process is executed (S404).

If it is judged that the document is the application form 60 (S403: Yes), the information of the identification image 606 is decoded by the decoding unit 38 (S405). In other words, the identification information of the terminal equipment 1 and the identification information of the authentication apparatus 2 are recognized from the image data obtained by scanning the application form 60.

Also, the handwritten information in the fields 601-605 on the image data obtained by scanning the application form 60 is processed by character recognition (S406).

Next, the scanner control unit 24 inquires the printer control unit 21 whether the combination of the identification information of the terminal equipment 1 and the identification information of the authentication apparatus 2 recognized in step S405 are registered in the application form management table 61 or not (S407). The printer control 21 searches the application form management table 61 to look for the inquired data and reports the result to the scanner control unit 24.

In the step S408, the scanner control unit 24 makes a judgment whether the response received from the printer control unit 21 is a response affirming that the inquired data is registered or not.

If a response shows that the inquired data is not registered (S408: No), the acceptance of the application form is rejected (S412). No process can be made in this case, or a sheet of paper with a printed statement showing that the application form is rejected can be outputted.

On the other hand, if a response is accepted confirming the inquired data's registration (S408: Yes), the application form is received and steps S409-S411 are processed.

In step S409, the scanner control unit 24 requests the printer control unit 21 to add the handwritten information recognized in the step S406 to the application form management table 61. The printer control unit 21 adds the handwritten information to the application form management table 61.

Next, the level of access from the terminal equipment 1 to the second network 52 by the visitor is determined (S410). For example, there are three levels of access; level 3 being the access right to the highest confidentiality information; the level 2 being the access right to the medium confidentiality information; and level 1 being the access right to the low confidentiality information. At this point, the scanner control unit 24 inquires the server 4 and others that can be used for authentication and search the authentication database stored in the server 4 for the applicant's office section and name. Thus, it is preferable from the management standpoint to have the authentication database in an external server which is different from the authentication apparatus 2 and it also makes it possible for a plurality of authentication apparatuses to share a single authentication database. FIG. 16 is an example of authentication database to be stored in a server. For example, based on the result of the search, the access level is assigned either to the level 3 if the applicant is an executive manager, to the level 2 if the applicant is a common manager, or to the level 1 if the applicant is a non-managerial person. This makes a finer relay control for the access request possible, thus contributing to the improvement of the security. The authentication database can be stored inside the authentication apparatus 2.

Next, the identification information of the terminal equipment 1 and the access level are registered on the routing management table. FIG. 17 is an example of the routing management table. The routing management table 62 contains the identification information field 621 of the terminal equipment 1 and the access level field 622. The judgment of the access level and registration are not essentially required in the present invention.

The judgment of whether or not to accept the application form can also be made either or both of the information that can identify the person and/or the information concerning the usage condition. This allows only the application form of an authenticated and orthodox applicant to be accepted and only the access request based on such an orthodox application will be authorized so that improvement of security is achieved. Furthermore, a process of rejecting all the application forms from non-managerial employees can be employed as well in this case. Moreover, a process of rejecting the application form, if the usage period exceeds more than one month, can be employed as well.

On the other hand, if it is judged that no scan job exists in step S401 (S401: No), a judgment is made as to whether any operation request for the routing management table 62 by a system manager with managing authority over the authentication apparatus 2 is received from the printer control unit 21 or not (S413). If it is judged that the operation request is not received (S413: No), the program returns to step S401.

On the other hand, if the operation request for the routing management table 62 is received (S413: Yes), the routing management table 62 is operated in accordance with the contents of the operation request (S414), and the program returns to step S401.

Figure 18:
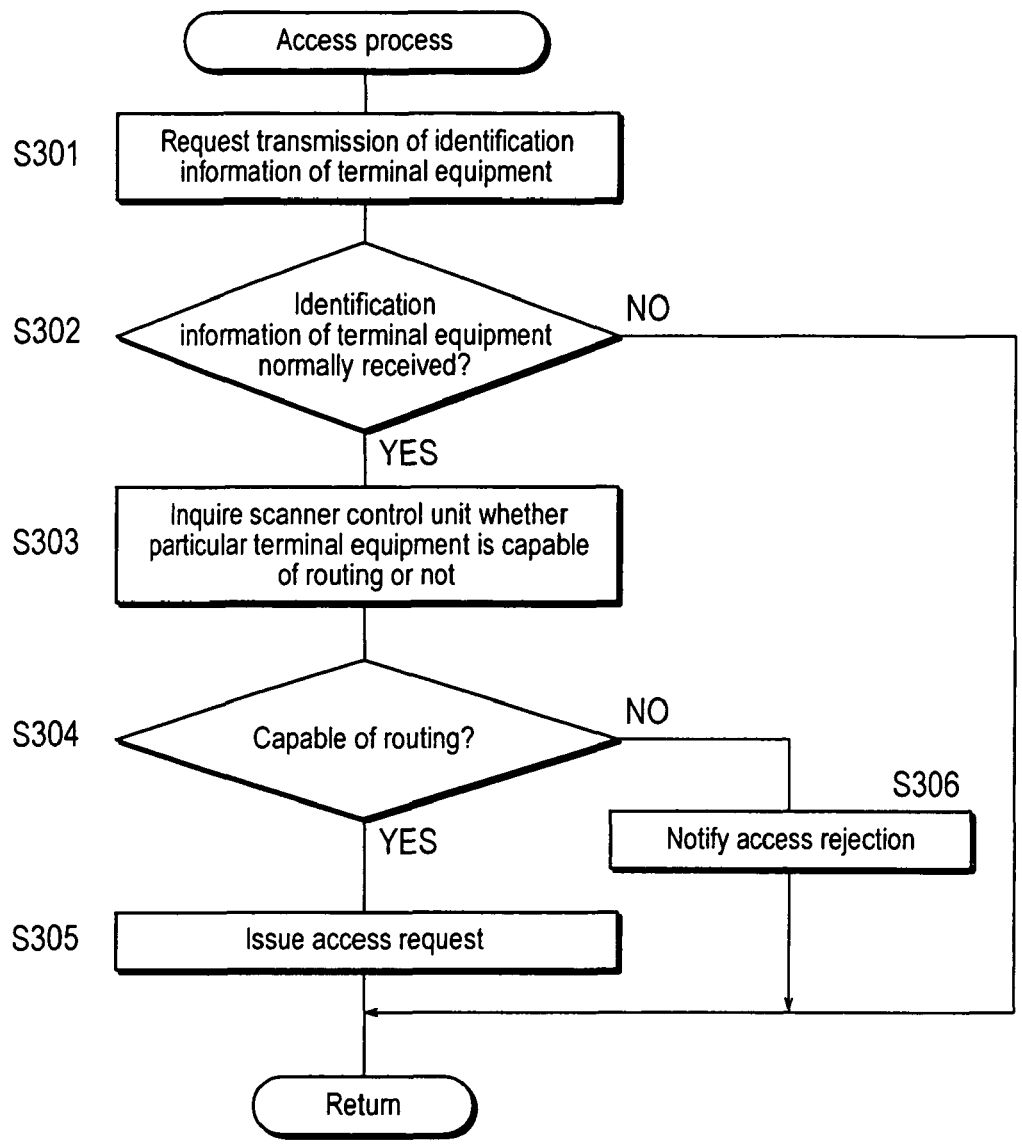
FIG. 18 is a flowchart showing the procedure of the access process.

Next, the access process (step S105 shown in FIG. 8) will be described below with reference to FIG. 18. As shown in FIG. 18, the printer control unit 21 requests the terminal equipment 1 to transmit the identification information of the particular terminal equipment 1, which is the source of access request, as the first step of the access process (S301).

Next, a judgment is made as to whether the identification information of the terminal equipment 1 is received properly or not (S302). If the identification information of the terminal equipment 1 is not received properly (S302: No), the authorization of the access is rejected and the program returns to the flow chart of FIG. 8.

If the identification information of the terminal equipment 1 is received properly (S302: Yes), the first routing unit 35 of the printer control unit 21 inquires the scanner control unit 24 whether the particular terminal equipment 1 can perform routing or not, in other words, whether the access can be relayed from the terminal equipment 1 to the second network 52 or not (S303). Then, the second routing unit 39 of the scanner control unit 24 checks if the first identification information of the terminal equipment 1 is registered by referencing the routing management table 62, authorizes the routing if it is registered, and rejects the routing if it is not registered, and notifies the first routing unit 35 of the printer control unit 21 accordingly. If the level of the access to the second network 52 is classified, the second routing unit 39 makes a judgment on the access to the resources of the second network 52 in accordance with the access level registered on the routing management table 62.

In step S304, a judgment is made as to whether the particular terminal equipment 1 can perform routing or not based on the response from the second routing unit 39 of the scanner control unit 24.

If it is judged that the routing can be done (S304: Yes), the first routing unit 35 of the printer control unit 21 issues an access request to the second routing unit 39 of the scanner control unit 24 (S305). The second routing unit 39 sends its access request to the second network 52 via the second network interface 25. Thus, the visitor whose application form is accepted can receive authorization to the access from the terminal equipment 1 to the second network 52.

On the other hand, if it is judged that the routing is impossible (S304: No), the notification of access request rejection is transmitted to the terminal equipment, which is the source of access request (S306).

Figure 9:
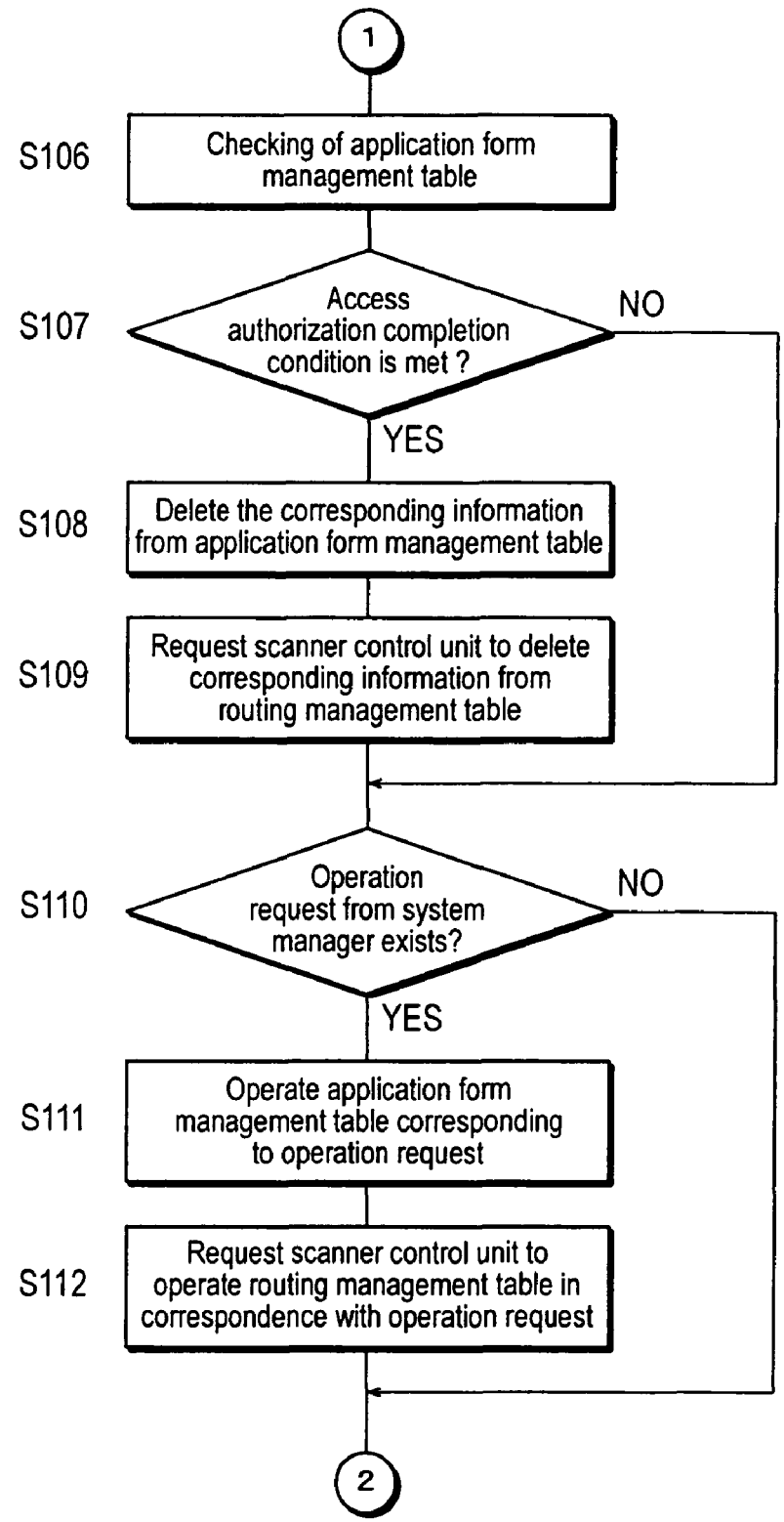
FIG. 9 is a flow chart showing the process sequence of the printer control unit of the authentication apparatus continued from FIG. 8.

Next, getting back to the flowchart shown in FIG. 9, the process of steps S106-S112 will be described below.

In step S106, the printer control unit 21 checks the application form management table 61. Specifically, the printer control unit 21 monitors the information concerning the usage condition such as usage period within the application form management table 61.

After the check, a judgment is made as to whether terminal equipment for which the condition for the access authorization completion exists or not (S107). if no terminal equipment for which the condition for the access authorization completion exists (S107: No), the program advances to the step S110.

On the other hand, if terminal equipment for which the condition for the access authorization completion exists (S107: Yes), the printer control unit 21 deletes the identification information from the application form management table 61 (S108), and requests the scanner control unit 24 to delete the information concerning the particular terminal equipment from the routing management table 62 (S109). The scanner control unit 24 deletes the information concerning the particular terminal equipment from the routing management table 62 based on the request.

In step S110, a judgment is made as to whether there is any operation request concerning the application form management table 61 and the routing management table 62 by the system manager who has the management authority over the authentication apparatus 2. The operation here includes referencing, registration, updating, deletion and initialization for the application form management table 61 and the rouging management table 62. If there is no operation request by the system manager (S110: No), the program returns to step S101.

If there is an operation request by the system manager (S110: Yes), the printer control unit 21 operates the application form management table 61 in accordance with the contents of the operation request (S111).

Next, the printer control unit 21 requests the scanner control unit 24 to operate the routing management table 62 in accordance with the operation request (S112).

As mentioned above, the authentication apparatus 2 outputs the application form 60 used in the access authorization request printed by the identification image 606 showing the identification information of the terminal equipment 1. The authentication apparatus 2 reads the application form 60 which is filled out by the user as required, recognizes the abovementioned information from the image data obtained by scanning, and authorizes the terminal equipment 1 that corresponds to the abovementioned recognized information to have access to the network 52.

Thus, according to the present embodiment, it is possible to relate the terminal equipment 1 to be used in access to the network 52 and the application form that can guarantee the fact that there has been a physical operation by the user at the authentication apparatus 2. Therefore, it is possible to quickly authorize a reliable visitor to have access to, for example, a network containing confidential information without causing the system manager's intervention while maintaining sufficient security.

Next, the second embodiment of the present invention will be described below focusing primarily on the points different from the first embodiment described above.

Figure 22:
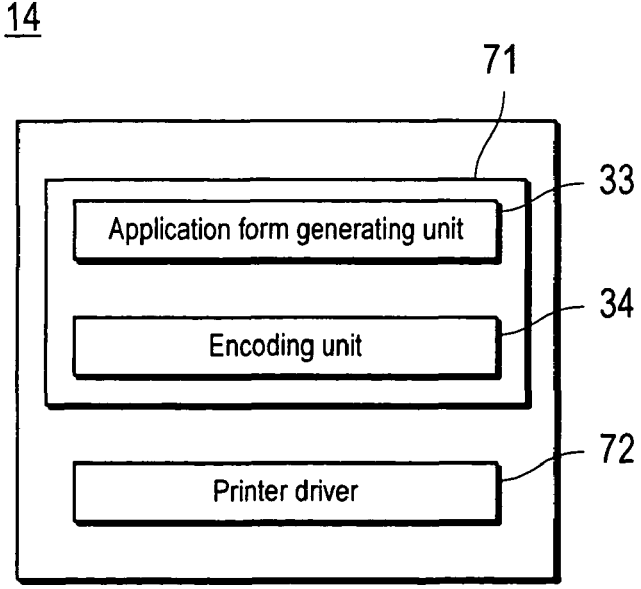
FIG. 22 is a diagram showing a printer driver and an application software for generating the application form.

In the first embodiment, the authentication apparatus 2 generated the image data of the application form. On the contrary, in the second embodiment, the application form generating unit 33 and the encoding unit 34 are stored in the terminal equipment 1, for example, the hard disk 14, as an application form generating application software 71 (see FIG. 22). In this case, the application software 71 is distributed to reliable users beforehand.

Figure 19:
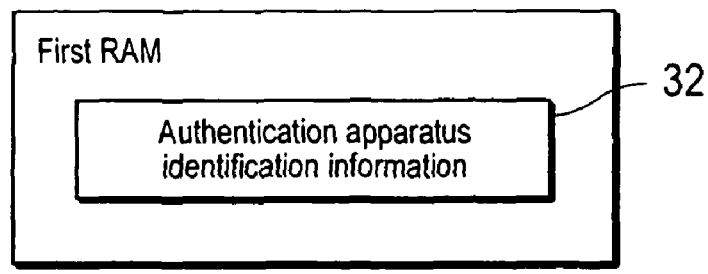
FIG. 19 is a diagram showing the authentication apparatus identification information according to a second embodiment.
Figure 20:
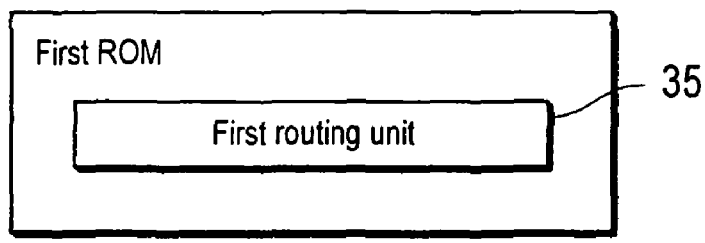
FIG. 20 is a diagram showing a first routing unit according to the second embodiment.
Figure 21:
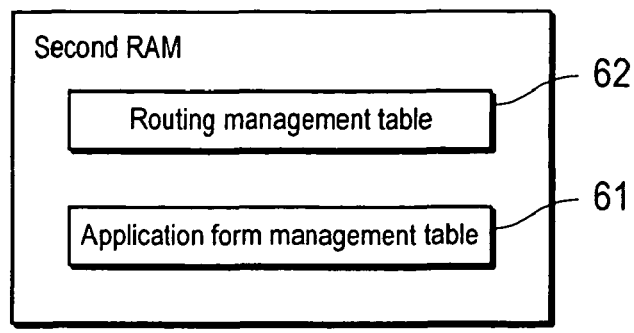
FIG. 21 is a diagram showing an application form management table and a routing management table according to the second embodiment.

Also, in the second embodiment, the first RAM 213 stores the authentication apparatus identification information 32 as shown in FIG. 19. Also, the first ROM 212 stores the first routing unit 35 as a program as shown in FIG. 20. As shown in FIG. 21, the second RAM 243 stores the routing management table 62 and the application form management table 61. The second ROM 242 stores various programs similar to those in the first embodiment (see FIG. 7).

In the second embodiment, the image data of the application form is generated by the application software 71 and then an instruction for printout of the application form is issued by a common printer 72 installed in the terminal equipment 1.

In addition to be able to achieve the same effect as in the first embodiment, the second embodiment eliminates the necessity for the printer control unit of the authentication apparatus of conducting any special process related to the application form generation or exchanging special information such as identification information with the terminal equipment 1, and leave it simply to deal with a printing process. This leads to simplification of the constitution of the authentication apparatus 2 and to a resultant reduction of manufacturing cost, also providing an effect of higher degree of general purpose uses as it can be materialized through a common printing process.

Moreover, in the second embodiment, if it is desired to print the identification image representing the identification information of the authentication apparatus 2 on the application form it is necessary for the terminal equipment 1 to obtain the identification information of the authentication apparatus 2. In that case, the printing process between the terminal equipment 1 and the authentication apparatus 2 can be materialized by means of a common printing process of obtaining information through bidirectional communication.

It is obvious that this invention is not limited to the particular embodiments shown and described above but may be variously changed and modified without departing from the technical concept of this invention.

Although MFP is assumed to materialize the authentication apparatus in the above embodiment, the invention is not limited to it. The authentication apparatus of the present invention can be materialized by an apparatus created by connecting a computer with a printing apparatus such as a printer.

The means and method of conducting various processes in the authentication system according to the present invention can be materialized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of the image processing device as a part of its function.

What is claimed is:

1. An authentication apparatus for authorizing access from terminal equipment to a specified network comprising:
    a printing unit for printing an application form for applying for said access authorization, which application form is printed with an identification image showing first information including identification information of said terminal equipment and identification information of said authentication apparatus;
    a registering unit for registering said first information to a management part;
    a scanning unit for scanning said application form to which an image of second information is added, the second information identifying a user of said terminal equipment;
    a recognizing unit for recognizing said first and second information from image data obtained by scanning; and
    an authorizing unit for authorizing the terminal equipment that corresponds to said first information recognized by said recognizing unit to have access to said network when the first information recognized by said recognizing unit is judged to be registered in the management part and a user authentication based on the second information is approved, wherein the authorizing unit executes the user authentication by inquiring a database external to the management part and searching the database for the second information that was scanned from the application form.

2. The authentication apparatus as claimed in claim 1 further comprising:
    a receiving unit for receiving from said terminal equipment the identification information of said terminal equipment.

3. The authentication apparatus as claimed in claim 1, wherein said identification image is encoded.

4. The authentication apparatus as claimed in claim 1, wherein
said recognizing unit further recognizes user's idiosyncratic information from image data obtained by scanning said application form, and
said authorizing unit authorizes access to said network only when the user that corresponds to the recognized idiosyncratic information is authenticated.

5. The authentication apparatus as claimed in claim 4 further comprising:
a judging unit for judging an access level suitable for the user that corresponds to the recognized idiosyncratic information, wherein
said authorizing unit authorizes access corresponding to the judged level.

6. An authentication system comprising terminal equipment and an authorizing apparatus for authorizing access from the terminal equipment to a specified network, wherein
said terminal equipment includes:
a transmitting unit for transmitting the terminal equipment's identification information to said authentication apparatus, and
said authentication apparatus includes:
a printing unit for printing an application form for applying for said access authorization, which is printed with an identification image showing first information including the identification information of said terminal equipment received and identification information of said authentication apparatus;
a registering unit for registering said first information to a management part;
a scanning unit for scanning said application form to which an image of second information is added, the second information identifying a user of said terminal equipment;
a recognizing unit for recognizing said first and second information from image data obtained by scanning; and
an authorizing unit for authorizing the terminal equipment that corresponds to said first information recognized by said recognizing unit to have access to said network when the first information recognized by said recognizing unit is judged to be registered in the management part and a user authentication based on the second information is approved, wherein the authorizing unit executes the user authentication by inquiring a database external to the management part and searching the database for the second information that was scanned from the application form.

7. The authentication system as claimed in claim 6, wherein
said authentication apparatus further comprises a receiving unit for receiving from said terminal equipment the identification information of said terminal equipment.

8. The authentication system as claimed in claim 6, wherein said identification image is encoded.

9. The authentication system as claimed in claim 6, wherein
said recognizing unit further recognizes user's idiosyncratic information from image data obtained by scanning said application form, and
said authorizing unit authorizes access to said network only when the user that corresponds to the recognized idiosyncratic information is authenticated.

10. The authentication system as claimed in claim 9, wherein
said authentication apparatus further comprises a judging unit for judging an access level suitable for the user who corresponds to the recognized idiosyncratic information, and
said authorizing unit authorizes access corresponding to the judged level.

11. A computer-implemented authentication method for authorizing access from terminal equipment to a specified network, comprising: outputting an application form for applying for said access authorization, which is printed with an identification image showing first information including identification information of said terminal equipment and identification information of said authentication apparatus; registering the first information to a management part; scanning said application form to which an image of second information is added, the second information identifying a user of said terminal equipment; recognizing said first and second information from image data obtained by scanning; executing a user authentication by inquiring a database different from the management part and searching the database external to the second information that was scanned from the application form; and authorizing the terminal equipment that corresponds to said first information recognized by said recognizing unit to have access to said network when the recognized first information is judged to be registered in the management part and the user authentication based on the second information is approved.

12. A non-transitory computer readable recording medium stored with a program for controlling an authentication apparatus that authorizes access from terminal equipment to a specified network, said program causing said authentication apparatus to execute a process comprising:
issuing an instruction for outputting an application form for applying for said access authorization, which is printed with an identification image showing first information including identification information of said terminal equipment and identification information of said authentication apparatus;
issuing an instruction for registering the first information to a management part;
issuing an instruction to scan said application form to which an image of second information is added, the second information identifying a user of said terminal equipment;
recognizing said first and second information from image data obtained by scanning;
executing a user authentication by inquiring a database different from the management part and searching the database external to the second information that was scanned from the application form; and
authorizing the terminal equipment that corresponds to said first information recognized by said recognizing unit to have access to said network when the recognized first information is judged to be registered in the management part and the user authentication based on the second information is approved.

* * * * *